United States Patent [19]

Stroupe

[11] 4,124,678
[45] Nov. 7, 1978

[54] METHOD OF MAKING TORTUOUS TUBULAR ARTICLES

[75] Inventor: James D. Stroupe, Newton, Pa.
[73] Assignee: Sipler Plastics, Inc., Doylestown, Pa.
[21] Appl. No.: 865,494
[22] Filed: Dec. 29, 1977

Related U.S. Application Data

[63] Continuation-in-part of Ser. No. 567,096, Apr. 11, 1975.

[51] Int. Cl.² .......................... B29C 1/12; B29D 23/00
[52] U.S. Cl. .................................................... 264/314
[58] Field of Search ............... 264/314, 257, 258, 255, 264/269, 313

[56] References Cited

U.S. PATENT DOCUMENTS

| | | | |
|---|---|---|---|
| 1,981,949 | 11/1934 | DeWitt | 264/314 |
| 2,514,597 | 7/1950 | Daly | 264/258 |
| 2,995,781 | 8/1961 | Sipler | 264/137 |
| 3,015,855 | 1/1962 | Merkel | 264/314 |
| 3,193,438 | 7/1965 | Schaefer | 264/257 |
| 3,755,037 | 8/1973 | Erwin | 264/313 |

FOREIGN PATENT DOCUMENTS

1,266,097  3/1972  United Kingdom ..................... 264/257

Primary Examiner—W. E. Hoag
Attorney, Agent, or Firm—Zachary T. Wobensmith, 2nd; Zachary T. Wobensmith, III

[57] ABSTRACT

Method for making tubular articles of tortuous configuration and of resin impregnated material. The method is intended to avoid resin-starved areas in the product. Specifically, tubular articles having high curvature, sharp transitions in cross section size and/or shape and close tolerance ends are provided these being made by applying and incorporating selectively placed porous components.

The article is formed in a mold by an inflatable mandrel which carries a continuous, surrounding knitted fabric component and one or more localized foam, felt and/or fabric devices of porous nature which control the supply, flow and/or final disposition of resin matrix in the molding process.

12 Claims, 21 Drawing Figures

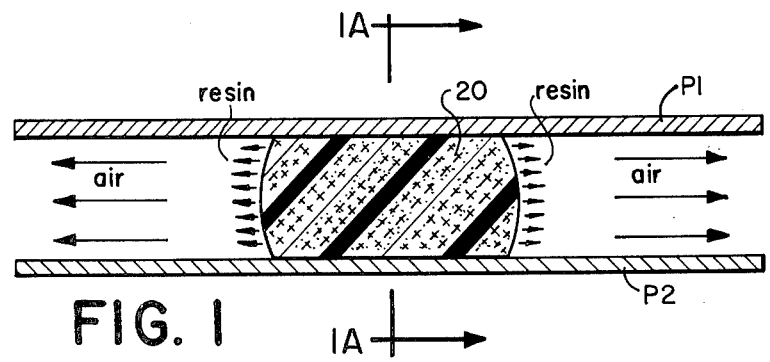
FIG. 1
FIG. 1A
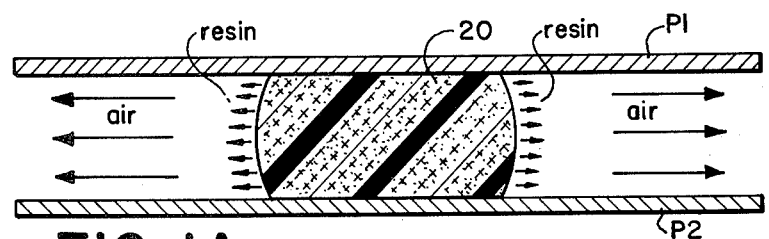
FIG. 2
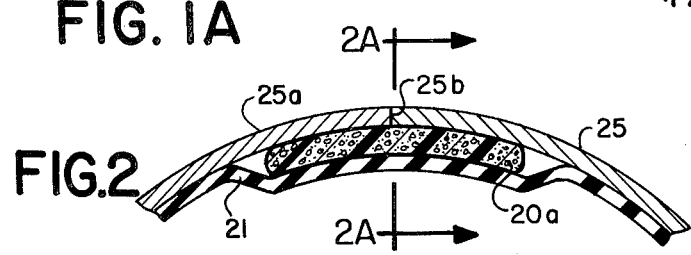
FIG. 2A
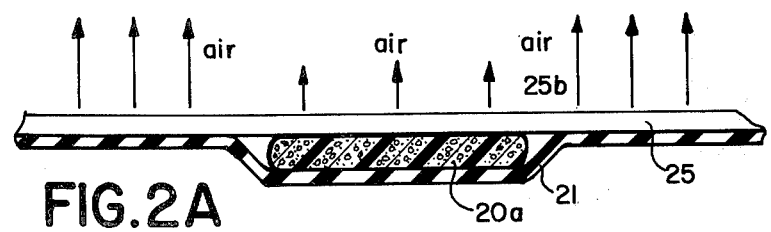
FIG. 3
FIG. 3A

METHOD OF MAKING TORTUOUS TUBULAR ARTICLES

CROSS REFERENCE TO RELATED APPLICATIONS

This application is a continuation in part of my prior application filed Apr. 11, 1975, Ser. No. 567,096 now abandoned.

In my applications for letters patent for Tubular Article and Method of Making Same, filed Oct. 1, 1973, Ser. No. 402,131, and Tubular Article and Method of Making Same, filed Mar. 25, 1974, Ser. No. 454,302, there are disclosed improvements to tubular articles formed in a mold with an inflatable mandrel carrying a continuous, surrounding knitted fabric resin distribution component with an exterior lamina or skin and an interior lamina or lining, respectively.

BACKGROUND OF THE INVENTION

1. Field of the Invention

This invention relates to tubular articles and methods of making the same and more particularly to such articles suited for air, gas or liquid flow and/or storage. It also relates to the art of compression molding reinforced thermosets and more particularly to directing resin flow by controlled air displacement during the molding process.

2. Description of the Prior Art

It has heretofore been proposed in the Sipler U.S. Pat. Nos., 2,990,855 and 2,995,781 to provide tubular conduits and methods of making the same which utilize the mechanical interactions between an inflatable mandrel and a surrounding knitted fabric resin carrying component to produce monolithic permanently shaped strong non-porous tube-like objects by a low pressure molding operation self-stopped by setting of the resin, the fabric being retained in the body of the finished article to contribute to the performance of the finished conduit. Such conduits have been extensively used in the automotive field on trucks for connecting air cleaners to carburetors and for other purposes and are tailored by choice of resin, filler and continuous, surrounding reinforcement so that each unit volume of the tubular articles produced described by the aforesaid one-shot, self-stopped molding operation can contribute substantially equally to the performance of the whole. The premolding reinforcement assembly and immersion resination operation essentially distribute these materials with circumferential symmetry and lengthwise uniformity thus primarily require the otherwise unaided directional stretch and incompressibility of rib-knit reinforcement to determine resulting wall thickness, wall thickness uniformity and strength throughout the overall tortuous conformations of such articles and their local changes in shape.

Each of the three steps of the Sipler method is both essential for the operation of the method and critical to the characteristics and uses of its products as conduits. Trapped air weakens such products. Continuous bubble paths can cause leaks. In this particular method as in all related methods for producing fiber reinforced thermosets without vacuum assistance, resin is caused to flow by directed compression pressure. Liquid resins are essentially incompressible and can only flow by their displacement of other resin or air. The Sipler method has neither external nor internally localized means for controlling these key flows and its self-controlled patterns of compression pressure distribution are complex. Consequently, considerable resin losses are accepted in order to insure the satisfactory quality of its tortuously shaped products.

None of several other methods now known for producing fiber reinforced thermosets can produce tortuous conduits. Each is characterized by a relatively simple pattern of compression pressure distribution and provides for its essential air displacements in ways which are not only relatively simple but also can remain quite inconspicuous until they cause production problems and product deficiencies of the same kinds as have long plagued the fiber reinforcement of thermosetting resins by hand lay-up or any of its more sophisticated filament and/or tape winding analogs. In all of these latter methods, proper management of air displacement is well known to be critical.

In order to better recognize the peculiarities of this common problem in the Sipler method and perceive the ways the present invention handles them in this special case, it will be helpful to summarize the related teachings of others in the following ways.

Chant, in British Pat. No. 1,266,097, uses a complete, resin-carrying, open cell foam layer as the key, integrated device of a new method for producing sheet laminates. Functionally, the Chant method is a geometrical simplification of the Sipler method. Chant replaces the complete outer Sipler fabric tube with a complete foam layer. All resin is uniformly introduced and provided by that layer. Solid platen compression is applied uniformly. Thermosetting heat is uniformly contacted by resin flow. Resin flow patterns are simplified by air displacement from all open edges of the sandwich laminate. Product shapes are flat and simple. Sheet thickness is determined by mold stops. A subsequent modification of this method shown in U.S. Pat. No. 3,867,221, to produce lower density sheets requires a complete layer of high rebound foam, a controlled decompression step and the uniform, partial reexpansion of this resin containing foam layer to trap a layer of foam-reinforced void space.

Neither Chant method provides any localized means for controlling air displacement. In effect, Chant's low density modification recognizes trapped void problems encountered in the operation of its precursor.

The low density Chant method does demonstrate that the viscosity gradient of a solidifying thermosetting resin system from a hot surface through a layer of resin-impregnated reinforcement is sharp. In no way does it or can it use its complete foam component, dry, as either a local heat insulator an temporary air valve or, wet, as a means for immobilizing its load of resin sufficiently to create a local source of pressure directable fluid flow and/or flow stoppage by thermoset skin formation against a hot mold surface. In short, Chant's simplification of the Sipler method is not operable for the far more complex process of producing tortuous, tubular shapes in an unstopped hot mold by single inflation of an expansible internal mandrel. Reinforced shroud laminates produced by obvious hot press adaptations of the Sipler method of the production of flat shapes have been available on the commercial market for several years and are not the subject of the present invention.

The pervading problem of air displacement is effectively handled by the Wiltshire method in U.S. Pat. No. 3,177,105, for producing reinforced tanks by the expansion of a supported, inflatable bag against a rigid preloaded unsplit outer mold. In a key, preliminary and in situ step heavy liquid resin is slowly pumped up into the confined and preassembled reinforcement layer to force and displace all of the lighter air upwards where it is vented from the top of the molding apparatus. Then the bag is inflated to form this air-freed and incompressible liquid-solid layer into its tank shape.

Both the Sipler method and all of the preferred embodiments of present improvements of it accomplish both the air displacement step and the product shaping step by one single, very rapid inflation of a pressurizing mandrel against a resinated assembly laid into a horizontally split mold. At the moment of mandrel inflation, Sipler's split, confining outer mold contains a considerably larger volume of air than of incompressible liquid resin and solid reinforcement. Air is free to exit along lengthwise mold lands and at the ends of the mold. In this particular setting, no adaptation of the single-direction, forced-gravity preliminary air displacement operations taught by Wiltshire is possible.

In a negligible pressure, ultraviolet activated method for molding a pre-wound load of thermoplastic tape to form a leg cast, Asbelle et al., in U.S. Pat. No. 3,823,208, use specially placed felt patches to provide the localized comfort of felt-air cushions. Specifically, no resin flows into, out of or through these patches. Always positioned within the multiple layer sock and tape assembly, they are precemented in place, integrated only by being surrounded and in no way participate in any resin flow control. For the entirely different purposes of the present invention, supplemental localized foam, felt and/or fabric components always participate in fluid flows and finally are integrated by impregnating resin.

In the Sipler method, all reinforcing components are loaded onto an inner tube mandrel, the assembly is trough coated with catalyzed thermosetting resin and this resinated assembly is placed into a simple split and rigid hot metal mold for single inflation forming. The surrounding hot mold determines the outer shape of the product. The inner shape of the product and thus both its wall thickness and its cross section for conduit use are determined by the local expansion of the mandrel against the constraints of its uniformly continuous load of expansible reinforcement and rapidly reacting resin matrix. There are no mold stops in this method. Wall thickness is entirely determined by the stretching and flowing interactions of its integrated components with an expandable mandrel which distorts locally when inflated so as to shape itself to the fixed shape complexities of the surrounding, rigid mold.

In the few seconds required for the mandrel to attain its final molding pressure, two major and critical fluid flows take place within the stretching, resinated reinforcement assembly. Air is displaced from the mold and liquid resin follows the air it is pressed against the flow through and fully impregnate the reinforcement and form the conduit product. The air which surrounded the resinated assembly when it was placed into the mold is mainly forced out through the parting lines of the mold and the air not previously displaced by resin within the resinated reinforcement assembly mainly exhausts along the expanding mandrel and out the open ends of the mold. The now relatively continuous layer of incompressible liquid resin follows both air flows until it is either trapped in the pressure packed reinforcement or stopped by the rapid increasing of its own viscosity by the heat of the surrounding mold or is wasted from the mold parting lines and its open ends.

Although the external operations of the Sipler method are simple, its internal performance is complex and becomes increasingly so as the necessary shapes of its products become more tortuous lengthwise and involve sharp changes in cross section size and/or shape. Increasing the sufficient excesses of resin is not always the most practical solution. Localized internal control of its air and resin flows is possible and practical and is accomplished by the instant invention. With minimum other operating changes, the primary air displacement patterns of the Sipler method are modified so as to utilize resin more efficiently.

As in all thermoset molding and, in part, because set resin is neither recoverable nor reworkable, the major wastes of resin are in rejected products and in resin distribution in acceptable products which are less than optimum for meeting the performance requirements of the product. In the first instance, all of the material, labor and time are lost. In the second, the high setting shrinkage of thermoset resins makes the shrink crackage of thick resin-rich pools a special problem to the Sipler method because its inflated mandrel expands its uniformly surrounding load of fabric and resin with considerable local variation in rates and extents to obtain tortuous and complexly shaped conduits. In service, the inner surfaces of conduits are highly important. In production, these surfaces are the most difficult to inspect.

Some resin must be wasted through outer mold lands in order to insure sufficient and satisfactory amounts are everywhere retained in product walls. With the uniformities of sock loading and resination peculiar to the Sipler method, minor amounts of such land flashing are, at present, the best insurance of satisfactory overall completion of each conduit by the molding process. In large measure and in the absence of any external mold stops in this self-stopped method, it is the packing of stretching fabric which determines local wall thickness as the mandrel expands itself and shapes itself and its surrounding fabric-resin load to the contours of the outer mold. During the very brief period when resin is sufficiently liquid to flow and accomplish the full impregnation of all fabric components, it is the only incompressible fluid in this solid-liquid-air system. Thus it flows when the system is compressed and stretched and always flows to follow the air it displaces.

The primary purpose of the present invention is to more favorably control those air displacement flows, locally, so as to permit safe and satisfactory decreases in the total amount of resin required to make each particular conduit. In effect, the air closed into the Sipler mold is not only at the same time both the cheapest and most costly raw material acted on by the method but also the most manageable one. Properly chosen and pre-filled with air (dry) or resin (wet), relatively small pieces of compressible open porous foam, felt and/or fabric are localized in main air displacement routes so as locally to optimize following flows of liquid resin when the mandrel expands. Primarily, the improvement taught here improves upon the peculiarities of the Sipler method. More generally, it is useful to other methods of thermoset molding by expansible mandrels.

SUMMARY OF THE INVENTION

In accordance with the invention, previously available tubular articles which can be of tortuous conformation, with high curvature, sharp transitions in cross section size and/or shape, and ends conforming to close tolerances, and which are free from porosity, light in weight, inert to many fluids, and resistant to high and low temperatures are improved by the more efficient distribution of resin accomplished internally by localized devices for directing air displacement and controlling resin flow. The improvements of the articles as to their production, utility and performance is effected by inclusion, in the unitary construction, of additional molding and/or reinforcing devices locally placed so as to additionally control the flow of resin matrix during the molding process and contribute to the satisfactory performance of the article. These devices advantageously include mats and unskinned foams of open cell, and partially open and closed cell structure, felts and fabrics.

It is the principal object of the invention to provide an improved unitary, permanently shaped, strong, rigid, knitted fabric reinforced tubular article with key complexities of shape more effectively formed by the inclusion of additional localized resin flow control devices which are incorporated in the article by the molding process.

It is a further object of the invention to provide improved methods of making tubular objects of the aforesaid character utilizing the mechanical interactions between an inflatable mandrel and resin distributing combinations of continuous surrounding knit fabric and localized foam, felt and/or fabric devices in a one-shot self-stopped low pressure compression molding operation.

It is a further object of the invention to provide simple and handy internal means for conserving resinous raw materials in the operation of the above highly specialized method.

It is a further object of the invention through its aforesaid typical applications to demonstrate the general utility of providing means for locally and internally modifying the patterns of air displacement and resin flow in the inflatable mandrel compression molding of reinforced thermosetting resin systems.

Other objects and advantageous features of the invention will be apparent from the description and claims.

BRIEF DESCRIPTION OF THE DRAWINGS

The nature and characteristic features of the invention will be more readily understood from the following description, taken in connection with the accompanying drawings forming part hereof, in which:

FIG. 1 is a diagrammatic vertical sectional view showing the action of a solid platen compressive pressure on a small sheet of compressible, air-surrounded, resin-filled porous material to create a localizable source of directed fluid flow;

FIG. 1A is a transverse sectional view taken approximately on line 1A—1A of FIG. 1;

FIG. 2 is a diagrammatic vertical sectional view showing the action of compressive pressure of an inflatable mandrel against a line vent which is partly covered by a small piece of compressible, air-surrounded and air-filled porous material to create a variable air displacement valve;

FIG. 2A is a transverse sectional view taken approximately on the line 2A—2A of FIG. 2;

FIG. 3 is a diagrammatic vertical cross sectional view showing the action of the compressive pressure of a liquid covered inflated mandrel against a mold land line vent which is partly covered by a small piece of compressible, air-surrounded and air-filled porous material to vent air locally and absorb impregnating resin following the air;

FIG. 3A is a transverse vertical sectional view taken approximately on the line 3A—3A of FIG. 3;

It should, of course, be understood that the description and drawings herein are illustrative merely and that various modifications and changes can be made in the structure disclosed without departing from the spirit of the invention.

Like numerals refer to like parts throughout the several views.

DESCRIPTION OF PREFERRED EMBODIMENTS

Referring now more particularly to FIGS. 1 through 4, inclusive, of the drawings, the two main modes of fluid flow control action of the porous, compressive devices of the invention will be made clear.

Figure 18:
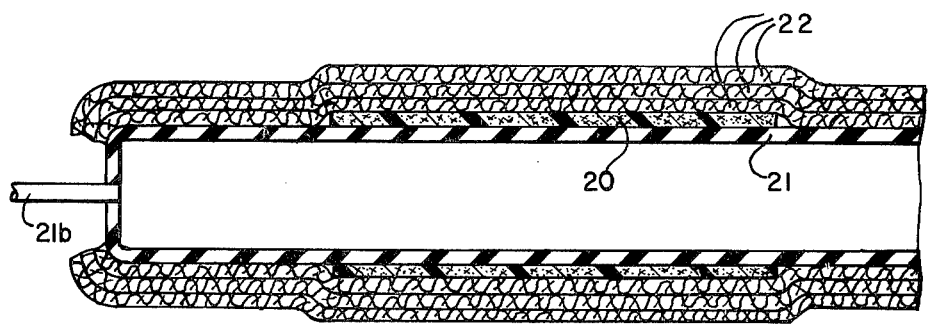
FIG. 18 is a view in longitudinal section of the inflatable mandrel with the knitted fabric assembly and localized resin control components therein employed in connection with the invention.

In FIGS. 1 and 1A the small piece of openly porous compressible sheet 20 is prefilled with liquid resin indicated by a plurality of small x symbols. Solid platen pressure between plates P1 and P2 squeezes the incompressible resin outward in all free directions displacing surrounding air in a continuous manner as compressive pressure is increased. The new component assembly shown in FIGS. 4 and 18 directly adapts this advantageous fluid flow pattern to the other operations of the earlier Sipler method to accomplish what will herein be subsequently referred to as insideout molding. From a central inside location directly against the inflatable mandrel 21 a continuous front of flowing resin displaces air outwardly through and from the dry textile tube 22 to accomplish full impregnation of this reinforcement before resin reaches surrounding hot mold surfaces of mold 25, 25a. Other embodiments of this invention minimize air entrapment by locally retaining delayed air exits in hot split mold surfaces.

In FIGS. 2, 2A and 3, 3A the openly porous partially compressed devices 20a are initially dry, i.e. filled with air indicated by a plurality of small o symbols and are shown placed so as to partly cover line vents 25b of the type left by the closure of simply split metal molds 25, 25a. FIGS. 2, 2A show that such devices allow air to pass through locally at rates variably lower than free line vents. FIGS. 3, 3A carry this simplified illustration of local air valving one step further to show how air-following resin is impeded by such devices so as to fully impregnate them with liquid resin after the uncovered parts of a mold land vent 25b of molds 25, 25a has been stopped off by rapid thermosetting of resin forced into them.

Figure 16:
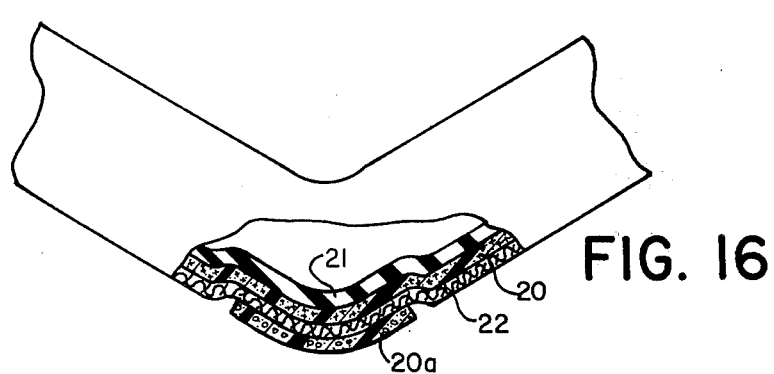
FIG. 16 is a view partly in elevation and partly in section of a portion of a wall at a curve of a tubular article made in accordance with the invention and having a resin control sheet component localized at an outer corner.
Figure 17:
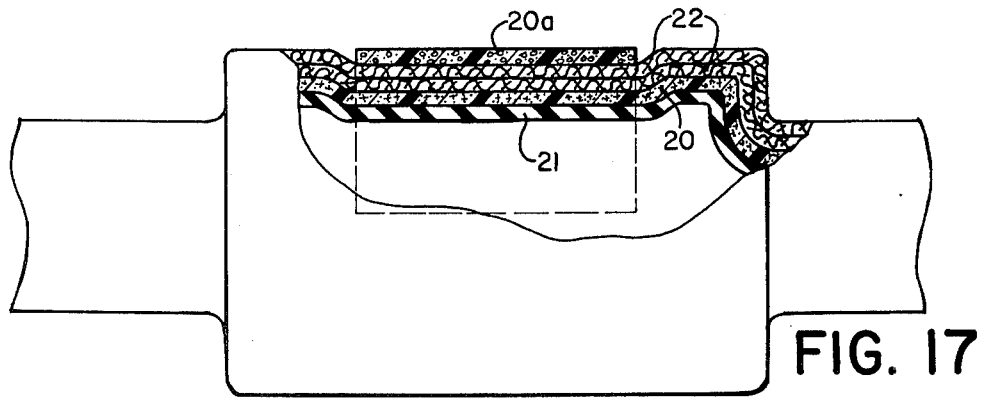
FIG. 17 is a fragmentary view partly in elevation and partly in section of a box shaped wall of a tubular object formed in accordance with the invention and employing a localized resin control sheet component.

Air-filled foams, felts, mats and fabrics are also well known heat insulators. Placed or by mandrel expansion forced directly against hot mold surfaces of molds 25, 25a they provide local means for timing rapid viscosity increases so as to allow the expanding mandrel to move air-following liquid resin away from corner pools in box shapes such as shown in FIG. 17, for instance, and more generally, are particularly useful in similarly thickening the outer peripheries of curves where continuous knitted sock components are most stretched and are least able to retain satisfactory wall thickness packing as shown in FIG. 16.

Whereas high resin capacity, high compressibility, stretchable foam devices are most useful in inside-out molding, the relatively low resin capacity-low compressibility combinations afforded by felts and mats and woven fabrics are more useful in external locations on the knitted sock load where they need only to be shaped and integrated by mandrel compression.

Inside-out molding and local air valving are operable in combination and are not restricted with respect to the type of thermosetting resin system employed. Newer chemically thickened polyester systems much as Marco's GR 14021 available from the Marco Division of W. R. Grace & Co. afford appreciable no-drip handling conveniences for inside-out molding but, otherwise, are operated by the present invention in the same ways which will now be described in greater detail for use with common liquid resin systems in which proportionating of resin, styrene and filler tailor operating viscosities as described in the Sipler U.S. Pat. Nos. 2,990,855 and 2,995,781.

Figure 4:
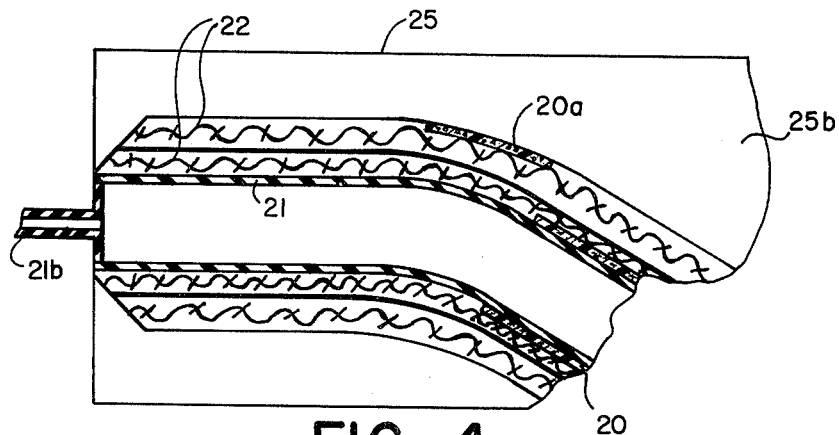
FIG. 4 is a diagrammatic horizontal sectional view taken at the mold line with a component assembly in place in the mold illustrating the included air and its exits.

FIG. 4 illustrates a portion of a simply split mold 25 with its mating component 25a removed and opened up so as to locate the non-mandrel air included when a component assembly readied for inside-out molding is laid into the hot mold. The centrally located, resin filled boot is air free. The surrounding dry knitted sock components are air filled. The whole assembly occupies only a small part of a full mold volume which is otherwise filled with air. All of this air must be displaced by mandrel expansion during the conduit forming process and can exit through mold land line vents and/or the open ends of the mold. Only the flow of liquid resin out the open ends is available to cause these air displacements. The compressed packing of stretched knitted sock components 25 is the primary mold stop. Air-following resin solidifies rapidly when it touches hot mold surfaces.

Through FIG. 4, it can be most directly appreciated that the complete assembly to be molded is in gravity contact with the hot mold surfaces it rests on during the time when it is being properly positioned before mold closure and mandrel inflation. The remaining circumference of the assembly is not in such contact. Liquid resins tend to flow downward and to be significantly advanced in their critical viscosity increases by this thermosetting heat. Conduits made by the older Sipler method consistently have wall thicknesses which 20–30% greater on such bottom sides than on their opposite top halves. All parts of the product perform equally in most uses. In effect, prior practice preceding the present invention requires considerable internal distributive wastage of resin in over-thickened bottom halves in order to insure satisfactory wall thicknesses in top halves. Both the inside-out and air valving modes of the present invention take advantage of the fact that air-filled porous materials are efficient heat insulators and thus accomplish useful control of thermosetting heat.

The additional and supplemental localized devices of the instant invention do not have to be both highly stretchable by mandrel expansion and also major contributions of solid reinforcement bulk to self-stop the forming process. They need be only openly porous, resin absorbent, compressible and readily bendable by mandrel pressure. Pieces of reticulated foam, felts and mats and fabric meet this minimum set of requirements with a sufficiently wide spread of performance combinations to handle most problems caused by local variations in mandrel expansion.

Liquid thermosetting resin which is immobilized against the surrounding hot mold surface very rapdily sets to solid. Therefore, local rates of mandrel expansion are as important as are final extents of expansion in determining the in-process distribution and final disposition of impregnating resin.

Because mandrel expansion of mandrel 21 is necessary to operate all of the supplemental devices of this invention and integrate them into conduit walls, the devices also locally modify the expansion of the mandrel 21. This interaction situation significantly differentiates inflatable mandrel molding from solid platen molding. Primarily as in the earlier Sipler method the shape of the mold and the constraints of the expanding fabric tubes both prevent local mandrel blowouts and modify local rates and extents of mandrel expansion to fit outer molding shapes. All preferred embodiments of the present invention primarily aim to use those mandrel expansion non-uniformities characteristic of each mold shape to more effectively direct the air displacements required to form a tortuous conduit of that shape.

Figure 5:
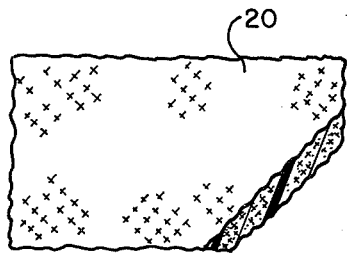
FIG. 5 is a fragmentary view partly in elevation and partly in section of a simple compressible resin filled sheet localizable fluid flow control component employed in connection with the invention.
Figure 6:
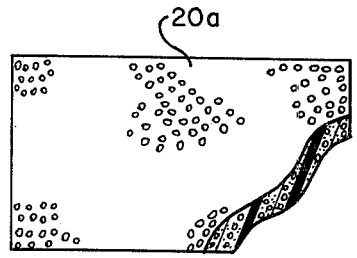
FIG. 6 is a fragmentary view partly in elevation and partly in section of a simple, compressible air-filled sheet localizable fluid flow control component employed in connection with the invention.
Figure 10:
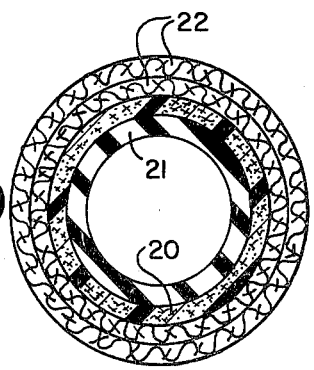
FIG. 10 is a transverse sectional view of a tubular construction showing one location of the fluid flow control component.
Figure 11:
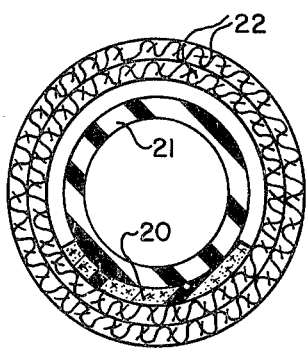
FIG. 11 is a transverse sectional view of a tubular construction showing another location of the flow controlling component.
Figure 12:
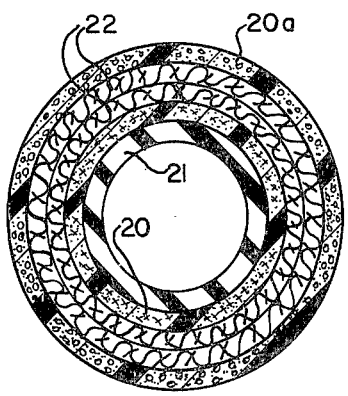
FIG. 12 is a transverse sectional view of a tubular construction showing still another location of the flow controlling component.
Figure 13:
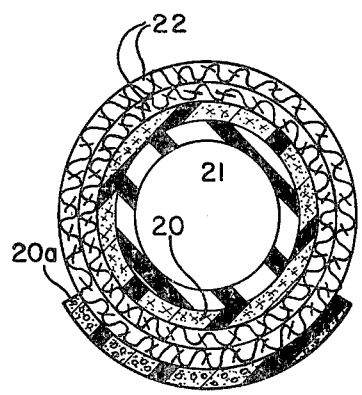
FIG. 13 is a transverse sectional view of a tubular construction showing still another location of the flow controlling component.

Localized pieces 20 of foam sheet, felt and/or mat patches and woven fabric flats are the preferred supplemental devices. For handling convenience, such discontinuous devices may be overlapped circumferentially to form body boots and/or end cuffs. FIGS. 5 and 6 show the most useful shapes. FIGS. 10 and 11 detail the positioning of resin filled shapes in interior air displacement paths while FIGS. 12 and 13 show the positioning of air filled shapes in exterior air displacement paths.

Figure 14:
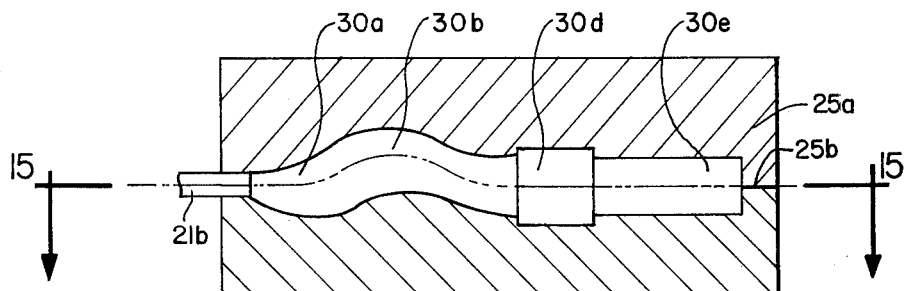
FIG. 14 is a transverse sectional view of a mold for making articles in accordance with the invention, taken approximately on the line 14—14 of FIG. 15.
Figure 15:
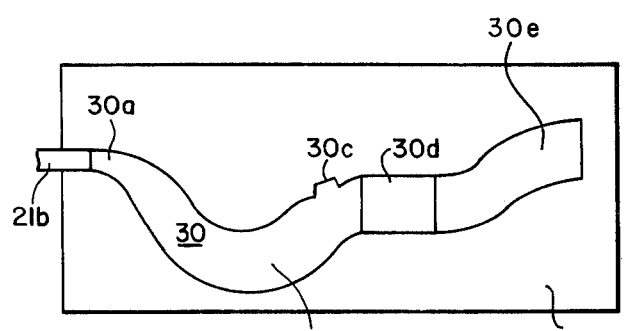
FIG. 15 is a plan view of one part of a mold shown in FIG. 14.

Referring now more particularly to FIGS. 14 and 15 of the drawings, a continuous integral rigid hollow tubular article 30 in accordance with the invention is there illustrated and includes an end section 30a, a curved intermediate section 30b, a support attachment section 30c, a box section 30d, with its axis curved or angled and in a plurality of planes, from which an end section 30e extends preferably relatively straight and open ended if desired. While the sections 30a, 30b, 30c and 30e are generally circular cylindrical and of varying transverse cross section as required for a particular end use the longitudinal axis is usually a tortuous line in a multiplicity of planes. The box section 30d is rectangular in transverse cross section.

The complex interior mold shape of the molds 25, 25a, controls the simple one piece initially cylindrical tubular mandrel 21 to the shape which the outer surface of the assembly thereon must finally attain along its exterior and with the mandrel shaped in a detailed manner to force each part of the assembly to its final position in the mold. Obviously the local rates at which the mandrel expands must be variable and critically determines the flow of the rapidly solidifying liquid resin. The deformation of the mandrel 21 to the shape for sock loading takes place during the very short time required for the mandrel 21 to attain full molding pressure on single inflation.

The shape shown in FIGS. 14 and 15 is merely illustrative of various complexly curved and shaped tubular objects and other objects which can be made in the practice of the invention.

There are several ways in which local controls of resin flow might be provided.

This invention details a practical way to accomplish this by controlling air displacement.

The mode of making the tubular article 30 will now be pointed out.

Figure 9:
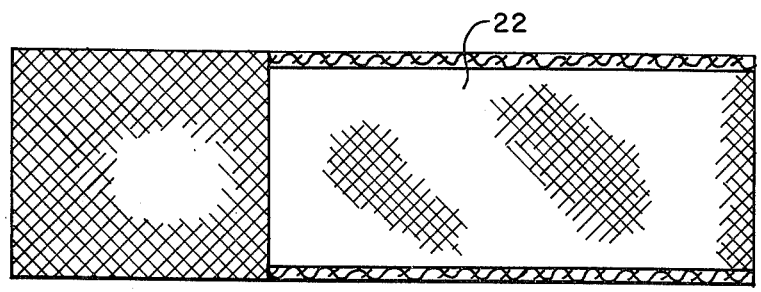
FIG. 9 is a view partly in elevation and partly in longitudinal central section of one of the continuous tubular stretchable knitted fabric components employed in connection with the invention.

Referring now to FIG. 9 of the drawings, one of the components of the invention is illustrated at 22, referred to as a knitted sock and preferably consists of a continuous seamless knitted tubular fabric, closed ended if desired, preferably rib-knit, so as to be circumferentially expansible and upon such expansion being free from any tendency to thin out appreciably. While the extent of circumferential expansibility of the knitted tube 22 can be varied, the expansibility is preferably of an order up to about 800%. Any suitable materials for this purpose can be employed, dependent on the degree of heat resistance required. For normal low temperature ranges of the order of 250° F., and suitable for many automotive conduits, cotton or rayon, and nylon, Dacron, or other thermoplastic yarns can be employed for the making of the knitted tube 22.

If a higher order of temperature resistance is required, say up to 500° F., it is preferred that the knitted tube 22 be made of yarns of glass fibers or asbestos.

It is also feasible to use yarns having mixtures of the filamentary materials referred to, or strands of different materials can be employed on different carriers, or needles, in knitting the fabric.

For certain purposes, also a plurality of knitted tubes 22 each with the yarns of different materials can be employed. The texture of such knitted tubes 22 can be varied, if desired.

An inflatable cylindrical mandrel or core tube 21 is provided, closed at one end 21a (see FIGS. 18 and 19) and at the other end has a valved inlet connection 21b. The core tube 21 is preferably of rubber, natural or synthetic, and of a thickness of the type ordinarily used for inner tubes for tires for automotive vehicles.

Figure 7:
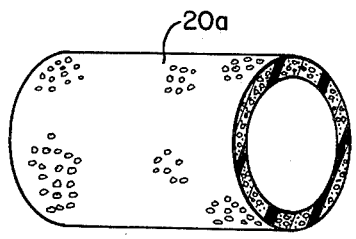
FIG. 7 is a perspective view of a cylindrical compressible resin absorbent localizable fluid flow control component used in connection with the invention.
Figure 8:
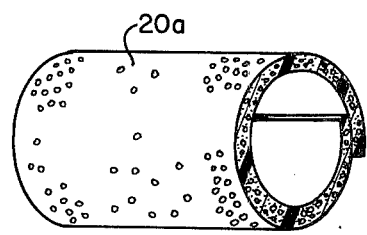
FIG. 8 is a perspective view of a cylindrically overlapped compressible resin absorbent localizable fluid flow control component used in connection with the invention.

The additional fluid flow controlling component of the most generally useful mode of operating the present invention to obtain inside-out molding is an overlapped sheet (FIG. 8) or pre-formed boot (FIG. 7) of reticulated polyurethane foam illustrated generally in FIG. 5 filled with resin and placed directly against the expansible mandrel 21 in the component assembly step of the method as shown in FIGS. 4 and 8 and operated as hereinafter explained.

Figure 19:
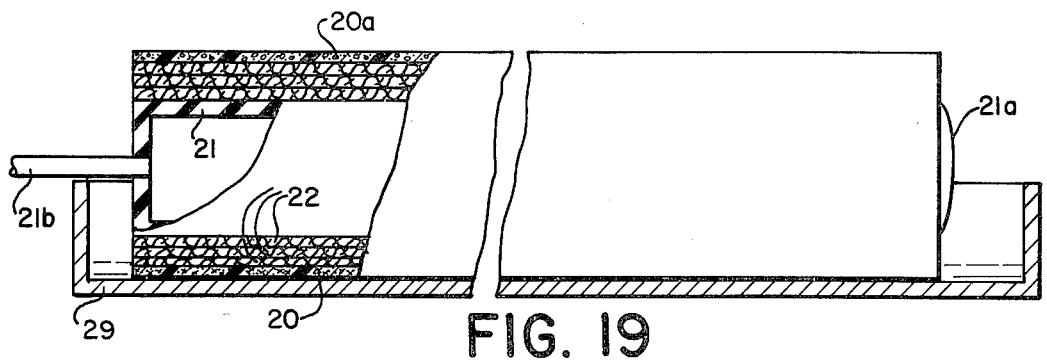
FIG. 19 is a vertical view partly in section and partly in elevation showing a wipe up resination step in the formation of the tubular article.

The foam sheet 20 (FIG. 6) which may have a thickness of the order of one quarter of an inch to one half of an inch depending upon particular requirements and is both highly resin absorbent and highly compressible and sufficiently strong and stretchable to contribute relatively little additional constraint to mandrel expansion is handily prefilled with liquid resin in a pan or trough, then positioned centrally around the partially inflated mandrel 21, (FIGS. 10 and 11). Dry sock reinforcement layers 25 are most handily rolled onto the mandrel 21 and over the localized resin-filled device 20. The completed component assembly can then be used to wipe up any excess or additionally needed resin remaining in the trough 29 as shown in FIG. 19. It is placed into the mold 25, 25a and shaped by mandrel expansion.

This compression forces resin out from the foam 20 in a continuous outward front which displaces air through the fabric layers 22 as they are being continuously impregnated with resin and out the mold lands 25b before following resin flows contact hot mold surfaces and are rapidly congealed to form very little flash waste.

For most conduit shapes a small amount of wiped up resin does not at all interfere with the primary outward air displacement patterns created by mandrel compression of the primary inside resin source. In fact, new chemically thickened polyester resin systems can be utilized in inside-out molding directly as cast sheets without the necessity of foam carriers by their proper formulation to also obtain satisfactory and versatile stretching properties in addition to no-drip handling convenience recommends that a foam carrier be used to provide the most versatile mechanical systems through choice of particular foams from many readily available on the open market. Fully reticulated powderpuff polyurethane foam having hundreds of tiny completely open pores per inch are less than 10% solid and highly resin absorbent, highly compressible and remarkably strong. This combination of properties best suits them for use as inside-out molding devices.

Inside-out molding obtains consistent wall thickness and thus reduces resin requirements for conduit sections which are relatively round and straight but frequently can be improved upon by combination with air valving devices placed across mold lands directly against hot mold surfaces external to the main assembly at points where local combinations of locked-in sock restraint and extreme mandrel expansion primarily determine local resin distribution. At the outer peripheries of sharp curves, for example, limited lengths of both mandrel and fabric layers are stretched highly by mandrel expansion and less fabric is available to self-stop the forming process to satisfactory wall thickness. At corners of box-shaped transitions resin pools accummulate and crack with the high solidification volume shrinkage which is characteristic of most common thermosetting resin systems. Supplementary air valving devices are particularly useful in these locations. Their choice, positioning and operation are hereinafter detailed.

At the outer peripheries of sharp curves, the need is more than just to obtain sufficient wall thickness. The obvious expedient of simply patching on more resin-loaded reinforcement does not best solve the air displacement part of the problem. In such areas and even highly constrained by stretching fabric, the mandrel performs much like a toy balloon does, stretching a relatively small local area very rapidly as pressure is increased to forming limits and thus causing resin to flow so rapidly locally that its congealing by the hot mold lands tends to leave air pinholes for the last remaining air to escape through. Relatively incompressible, openly porous sheets of dry felt placed across line mold vents provide local heat insulation, local packing, means for locally delaying following resin flow and immobilizing it to be more uniformly congealed by thermosetting heat and thus prevent pinholing.

In part, the pooling of resin in the corners of box transitions is caused by the same pair of local extremes of mandrel expansion and fabric thinning encountered at outer curves and again delaying the impregnating flow by resin following the escaping air. In this special case it is important to provide sufficient open volume in the device similarly placed across mold land line vents and acting similarly, to valve air out of the mold so that the last shaping of the mandrel to fit such corners will have enough contigously available free volume to flow into and be utilized rather than wasted. Pieces of dry Fiberglas mat such as are readily available from the Owens-Corning Company in a considerable spread of properties have turned out to be most satisfactory for solving corner pooling problems. Dry pads of steel wool placed as shown in FIG. 16 are also useful. The high heat conductivity of their metal composition is more than overriden by the high insulating properties of the air they contain initially and they are readily impregnated with integrating resin pushed into them following the air they locally vent from box corners which, otherwise have no access to mold lands.

A considerable variety of openly porous, compressible, resin absorbent materials besides those particularly preferred for the reasons described here are useful to accomplish inside-out molding and land vent air valving in this improvement upon the Sipler method and there are useful placements of them within the assembly of fabric components rather than directly against the inflatable mandrel, wet, and directly against the hot mold and locally across its line vents, dry, which operate to provide some of the advantages shown here and to obtain some increases in the efficiency of resin utilization. They also operate the principles of the invention.

The preferred embodiments detailed here are illustrative, not limiting, to the invention. They may be used in conjunction with and to supplement the immersion resination step of the prior assembly-resination-molding art. Most effectively, they are employed to solely or majorly supply and control fluid flow in a new resination-assembly-molding method. A typical sequence of operations will now be outlined.

A sufficient number of knit sock layers 22 to stretch-pack to the desired wall thickness is pre-cut to the length of the duct and 4 to 6 times their total weight of precatalyzed resin is taken up from an open trough or pan into a high resin capacity, high compressibility polyurethane foam sheet or preformed boot 20 placed directly around the partially inflated mandrel in lengthwise central location. The continuous sock tubes 22 are then rolled down over the resin-loaded mandrel. The completed assembly may then be used to wipe up any excess resin in the pan and is placed into the open, preheated split mold. Small patches of dry low resin capacity, low compressibility felt or mat are placed against hot mold surfaces and across mold land joints at the outer peripheries of sharp curves and/or box transitions. The mold 25a, 25 is closed and clamped closed in a mechanical press and the mandrel 26 is immediately and rapidly inflated to a sufficiently high pressure to obtain complete impregnation and permanent integration of all of the fabric tubes 22 into conduit walls in cure times of 1 to 5 minutes at mold temperatures high enough to trigger the thermosetting exotherm of the resin. The liquid resin which is rapidly squeezed outward in all free directions from its central location displaces air outward circumferentially and lengthwise through the fabric layers 22 as it impregnates them, is congealed by contact with hot mold surfaces and integrates air valving devices with final, slowed, air-following resin flows. After, and only after complete mandrel pressure release, the mold 25a, 25 is opened, its formed duct is removed for inspection and its forming mandrel 21 is pulled out for reloading to repeat the above resination-assembly-molding sequence.

I claim:

1. The method of making a unitary hollow rigid tubular article by air displacement in a mold which comprises:

mounting on an expansible and flexible core tube a thermosetting resin containing compressible element in at least partial covering relation to the core tube;

mounting in covering relation to said element and in surrounding relation to the core tube an elongated circumferentially expansible seamless knitted fabric tube of a continuous length corresponding to a desired length of the finished article;

applying locally in at least partial covering relation to said fabric tube, adjacent abrupt changes in tube configuration, a porous, compressible member to control flow of resin and air;

inserting the expansible tube with assembled layers into an elongated smooth cavity in a mold which cavity has a fixed torous non-planar longitudinal configuration and a variable cross sectional area along the length thereof and is shaped to conform to a desired exterior shape of the finished article, expanding the core tube to compress resin from the resin containing element and expanding and distorting the fabric tube thereon to conform to the elongated mold cavity by pressure applied by the core tube and by the expansion forcing displacement of air and distribution of the resin into the interstices of the fabric tube and the compressible member, curing the resin by heat in the mold, removing the formed assembly from the mold, and removing the core tube.

2. The method defined in claim 1 in which
said compressible element is an open pore stabilized compressible synthetic foam.

3. The method defined in claim 1 in which
the fabric tube is rib knit.

4. The method defined in claim 1 in which
said air flow restricting member is disposed in partial longitudinal intersecting relation to at least one of the mold parting lines and is in contact with the mold.

5. The method defined in claim 1 in which
at least one additional knitted fabric tube is applied onto said fabric tube.

6. The method defined in claim 5 in which
additional thermosetting resin is applied to the outer of said knitted tubes.

7. The method of claim 1 wherein said compressible member is a fibrous mat of low resin capacity and low compressibility.

8. The method of claim 7 wherein said compressible member is a fibrous felt of low resin capacity and low compressibility.

9. The method defined in claim 1 in which
the length of said resin containing element is less than the length of the finished article.

10. The method defined in claim 9 in which the compressible element is of elongated tubular shape.

11. The method defined in claim 9 in which
the compressible element has longitudinally disposed overlapping edges.

12. The method defined in claim 9 in which
the compressible element has its edges disposed in spaced relation.

* * * * *

UNITED STATES PATENT OFFICE
CERTIFICATE OF CORRECTION

Patent No. 4,124,678  Dated November 7, 1978

Inventor(s) James D. Stroupe

It is certified that error appears in the above-identified patent and that said Letters Patent are hereby corrected as shown below:

Column 2

Line 51, after "insulator" change "an" to -- and --

Column 7

Line 36, change "liwng" to -- lowing --

Column 8

Line 54, after "very" change "rapdily" to -- rapidly --

Signed and Sealed this

Thirteenth Day of February 1979

[SEAL]

Attest:

RUTH C. MASON
Attesting Officer

DONALD W. BANNER
Commissioner of Patents and Trademarks